United States Patent
Soane et al.

(10) Patent No.: US 6,472,476 B1
(45) Date of Patent: *Oct. 29, 2002

(54) OIL- AND WATER-REPELLENT FINISHES FOR TEXTILES

(75) Inventors: David S. Soane, Piedmont, CA (US); David A. Offord, Castro Valley, CA (US)

(73) Assignee: Nano-Tex, LLC, Emeryville, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 09/671,660

(22) Filed: Sep. 27, 2000

Related U.S. Application Data

(63) Continuation-in-part of application No. 09/546,199, filed on Apr. 10, 2000, now Pat. No. 6,380,336, which is a continuation-in-part of application No. 09/483,891, filed on Jan. 18, 2000, now abandoned.

(51) Int. Cl.[7] ............................................. C08F 259/00
(52) U.S. Cl. ...................................... 525/200; 525/276
(58) Field of Search ...................... 526/245; 525/200, 525/276

(56) References Cited

U.S. PATENT DOCUMENTS

| | | |
|---|---|---|
| RE28,914 E | 7/1976 | Marco |
| 4,029,867 A | 6/1977 | Wasley et al. |
| 4,032,495 A | 6/1977 | Perronin et al. |
| 4,043,965 A | 8/1977 | Dickson |
| 4,296,224 A | 10/1981 | Fukui ........................ 526/243 |
| 4,314,805 A | 2/1982 | McKnight ...................... 8/137 |
| 4,463,127 A * | 7/1984 | Alberts ........................ 524/731 |
| 4,590,236 A | 5/1986 | Koenig et al. ................. 524/460 |
| 4,778,915 A | 10/1988 | Lina et al. ..................... 560/29 |
| 4,820,307 A | 4/1989 | Welch et al. |
| 4,971,835 A * | 11/1990 | Munch ........................ 427/421 |
| 5,178,915 A * | 1/1993 | Moyle ......................... 427/318 |
| 5,221,285 A | 6/1993 | Andrews et al. |
| 5,362,847 A | 11/1994 | Miller et al. ................. 528/403 |
| 5,516,578 A | 5/1996 | Coppens |
| 5,534,604 A | 7/1996 | Bildhauer et al. |
| 5,543,214 A | 8/1996 | Groshens et al. ............. 428/261 |
| 5,589,028 A * | 12/1996 | Robinson .................. 156/306.6 |
| 5,594,125 A | 1/1997 | Seyschab et al. ............. 536/103 |
| 5,616,287 A * | 4/1997 | Finter ........................ 252/518 |
| 5,707,708 A | 1/1998 | Pechhold |
| 5,725,789 A | 3/1998 | Huber et al. |
| 5,834,088 A | 11/1998 | Pecchold |
| 5,876,617 A | 3/1999 | Sato et al. |
| 5,919,527 A | 7/1999 | Fitzergerald ............. 427/389.7 |
| 6,140,408 A * | 10/2000 | McCarthy .................... 524/506 |
| 6,281,287 B1 * | 8/2001 | Montanari .................... 525/63 |

FOREIGN PATENT DOCUMENTS

| | | |
|---|---|---|
| CA | 2182146 A1 | 1/1997 |
| DE | 3818391 A1 | 12/1988 |
| DE | 4035378 A1 | 5/1992 |
| DE | 19520989 A1 | 12/1996 |
| EP | 0 294 648 | 12/1988 |
| EP | 0 300370 A2 | 1/1989 |
| EP | 0 508 136 | 10/1992 |
| EP | 0 573 526 B1 | 3/1996 |
| EP | 0 648 890 B1 | 12/1996 |
| EP | 0 756 033 A2 | 1/1997 |
| EP | 1 004 701 | 5/2000 |
| GB | 809745 | 3/1959 |
| WO | WO 92/10605 | 6/1992 |
| WO | WO 92/12286 | 7/1992 |
| WO | WO 92/15748 | 9/1992 |
| WO | WO 92/17636 | 10/1992 |
| WO | WO 92/19680 | 11/1992 |
| WO | WO 97/11218 | 3/1997 |
| WO | WO 98/00500 | 1/1998 |
| WO | WO 99/19276 | 4/1999 |

OTHER PUBLICATIONS

U.S. patent application Ser. No. 09/274,749, filed Mar. 23, 1999.
Hoffman, A.S. *Macromol. Symp. 98,* 645–664 (1995).
International Search Report, mailed Nov. 29, 2000, in PCT/US00/24865, which corresponds to the parent U.S. application of the present application.

* cited by examiner

*Primary Examiner*—Paul R. Michl
(74) *Attorney, Agent, or Firm*—Jacqueline S. Larson

(57) ABSTRACT

The present invention is directed to a water- and oil repellency-imparting preparation for fibrous and other substrates, the preparation comprising a fluorinated polymer and a tacking monomer, oligomer or polymer containing at least one anhydride functional group or a group capable of forming an anhydride functional group, optionally together with an anhydride-forming catalyst, such as sodium hypophosphite. The preparation can further optionally comprise other additives such as, for example, an extender; a softener; an antioxidant; a surfactant; and/or a plasticizer.

16 Claims, No Drawings

OIL- AND WATER-REPELLENT FINISHES FOR TEXTILES

This application is a continuation-in-part of copending application Ser. No. 09/546,199, filed Apr. 10, 2000, U.S. Pat. No. 6,380,336, which is a continuation-in-part of application Ser. No. 09/483,891, filed Jan. 18, 2000, abandoned, the entire disclosures of which are incorporated herein by reference.

FIELD OF THE INVENTION

This invention relates to textile treatment compositions for imparting durable water and soil resistance to fibrous substrates, including textiles.

BACKGROUND OF THE INVENTION

The treatment of fibrous substrates with fluorochemical compositions to impart water and oil repellency is known; see, for example, Banks, Ed., Organofluorine Chemicals and Their Industrial Applications, Ellis Horwood Ltd., Chichester, England, 1979, pp. 226–234.

Generally, copolymers having a water- and oil-repellence are copolymers each comprising a (meth)acrylate monomer containing a perfluoroalkyl group capable of directly giving a water- and oil-repellence, a fluorine-free monomer capable of improving an adhesiveness to the surfaces of materials to be treated such as fibers, etc., through an affinity thereto, and a monomer capable of giving a durability through self-crosslinking or reaction with reactive groups on the surface of the materials to be treated, typical of which are copolymers having N-methylol groups combined with the main chain, such as copolymers of perfluoroalkyl group-containing (meth)acrylate and N-methylol acrylamide-based copolymers. However, when the fibrous or other substrate is treated with these copolymers, formaldehyde is produced, which is highly undesirable from an environmental and safety standpoint.

SUMMARY OF THE INVENTION

The present invention is directed to treatment preparations useful for the treatment of textiles and other webs to provide substantially permanent, durable water and soil repellency to fibrous substrates and other materials without the production of formaldehyde. More particularly, the invention is directed to preparations that comprise a fluorinated polymer and a monomer, oligomer or polymer selected from those containing an anhydride functional group or capable of forming an anhydride functional group (referred to herein and in the appended claims as a "tacking polymer"). It has been found by the applicants that this monomer, oligomer or polymer increases the performance and durability of the fluoropolymer by an unknown mechanism, possibly (without being bound by theory) by "tacking" the fluoropolymer to the surface of the fabric.

By "fluorinated polymer" or "fluoropolymer" is meant that the polymer will contain some perfluorinated or partially fluorinated alkyl chains to impart water and oil repellency to coated objects. It may additionally be advantageous for the polymer to contain other groups such as normal alkyl chains; groups that can increase the water solubility or stability of the suspension of the polymer, such as chains of polyethylene glycol or other polar groups; one or more different groups that can crosslink to each other or to the material being coated; or groups that increase polymer flexibility, flame retardancy, the softness of a textile, or resistance to bacteria or mildew.

The preparation can be applied, e.g., to a fibrous substrate by contacting the substrate with the preparation, for example, by immersing it in a bath of the composition or by spraying the composition onto the substrate. The fluoropolymer and the tacking polymer may be added together to the bath, or the tacking polymer may be added to the bath following initial exposure of the substrate to the fluoropolymer. The treated substrate is then cured to remove the solvent therefrom and allow reaction with the textile.

The composition of this invention imparts desirable water and oil repellency to the substrates treated therewith without adversely affecting other desirable properties of the substrate, such as soft hand (or feeling). The composition allows for nonformaldehyde releasing binding to cotton and other substrates. The composition of the present invention can be used for providing water and oil repellency to fibrous substrates such as textiles, papers, non-woven articles or leather.

This invention is further directed to the yarns, fibers, fabrics, textiles, finished goods or other fibrous substrates treated with the water- and soil-resistant preparations of the invention. Such fibrous substrates exhibit a greatly improved, durable water and soil repellency. By "durable water and soil repellency" is meant that the textile, web or other substrate will exhibit a repellency or resistance to water and oily soils even after multiple launderings.

DETAILED DESCRIPTION OF THE INVENTION

As used herein and the appended claims, the term "(meth)acrylate" refers to either the acrylate or the methacrylate compound, unless otherwise indicated.

The fluoropolymer useful in the invention comprises fluoroaliphatic radical-containing agents. These fluorinated monomeric, oligomeric or macromonomeric agents may be chosen from any of those that are useful for the treatment of fabrics to obtain repellency of water and oily and aqueous stains. Fluoroaliphatic radical-containing agents include condensation polymers such as polyesters, polyamides or polyepoxides and vinyl polymers such as acrylates, methacrylates or polyvinyl ethers. Further examples of such fluoroaliphatic radical-containing water and oil repellency-imparting agents include those formed by the reaction of perfluoroaliphatic thioglycols with diisocyanates to provide perfluoroaliphatic group-bearing polyurethanes. Another group of compounds which can be used are fluoroaliphatic radical-containing N-methylolcondensation products. Further examples include fluoroaliphatic radical-containing polycarbodiimides, which can be obtained by, for example, reaction of perfluoroaliphatic sulfonamido alkanols with polyisocyanates in the presence of suitable catalysts. The fluoropolymers may include —$CF_3$ and —$CHF_2$ end groups, perfluoroisopropoxy groups (—$OCF(CF_3)_2$), 3,3,3-trifluoropropyl groups, and the like. The polymers may include vinyl ethers having perfluorinated or partially fluorinated alkyl chains.

The fluoropolymer preferably comprises one or more fluoroaliphatic radical-containing acrylate or methacrylate monomers. Such monomers have the structure of Formula I, below:

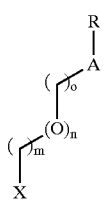

Formula I

In the compound of Formula I, for example:

m is 0 to 2;

n is 0 or 1;

o is 1 or 2;

A is —SO$_2$—, —N(W)—SO$_2$—, —CONH—, —CH$_2$—, or —CF$_2$—;

R is a linear, branched, or cyclic fluorocarbon, including fully or partially fluoronated hydrocarbons, wherein R may be, for example, a C$_1$ to C$_{30}$ fluorocarbon;

W is hydrogen or C$_1$–C$_4$ lower alkyl; and

X is acrylate, methacrylate, or a carbon-carbon double bond.

Fluoroaliphatic radical-containing agents are available commercially or they may be synthesized. Commercially available agents include FX-13, a fluorinated acrylate from 3M; FX-14, a fluorinated methacrylate from 3M; Zonyl TA-N, a fluorinated acrylate from DuPont; Zonyl TM, a fluorinated methacrylate from DuPont; and FAVE™ products from AlliedSignal (Morristown, N.J.).

In a presently preferred embodiment of the invention, the fluoropolymer comprises a) a fluoroaliphatic radical-containing agent, (b) stearyl (meth)acrylate; and (c) a chlorine-containing compound, such as vinylidene chloride, vinyl chloride, 2-chloroethylacrylate, or 2-chloroethyl vinyl ether.

The fluoropolymer may be further copolymerized with i) hydroxyalkyl (meth)acrylate to increase the performance and permanency of the resulting copolymer, ii) a compound such as poly(ethylene glycol) (meth)acrylate to improve solubility of the copolymer in water, and/or iii) a chain terminator, such as dodecanethiol, mercaptosuccinic acid, or other similar compounds, which acts to keep the molecular weight of the polymer low so that it is more readily dispersible in water and can better penetrate the fabric.

The tacking polymer as the other component of the present treatment preparation is selected from those monomers, oligomers or polymers that contain at least one anhydride functional group or at least one group capable of forming an anhydride functional group. Such monomers can include carboxylic acids and carboxylic acid anhydrides and can include, but are not limited to, maleic acid, acrylic acid, itaconic acid, bisacrylamidoacetic i acid, 3-butene-1,2,3-tricarboxylic acid, 2-carboxyethyl acrylate, methacrylic acid, allylsuccinic acid, citraconic acid, 4-methacryloxyethyl trimellitic acid, 4,4'-hexafluoroisopropylidenebisphthalic acid, and the like, and the anhydride form of any of the above acids. The tacking polymer may be a copolymer or a graft-copolymer of any of the above monomers, with each other or with other monomers. Examples include, but are not limited to, poly(acrylic acid), poly(butadiene/maleic acid), poly(poly(maleic anhydride/1-octadecene), polybutyl acrylate/acrylic acid), poly(ethyl acrylate/acrylic acid), poly(ethylene/acrylic acid), poly(maleic acid), poly(ethylene/maleic acid), poly(mthacrylic acid), poly(methylmethacrylate/methacrylic acid), poly(styrenesulfonic acid/maleic acid), poly(vinyl methyl ether/maleic acid), poly(vinyl methyl ether/monobutyl maleate), poly(vinyl methyl ether/monoethyl maleate), poly(vinyl methyl ether/monoisopropyl maleate), starch and poly(acrylamide/acrylic acid) graft, poly(azelaic anhydride), and poly(maleic anhydride). The salts of the above monomeric, oligomeric or polymeric acids are also useful in this invention.

Hydroxyalkyl (meth)acrylate for use in the invention as an optional component of the fluoropolymer includes, for example, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and the like. When the hydroxyalkyl (meth)acrylate is copolymerized, further improvement of durability can be attained with simultaneous use of a crosslinking agent such as butane tetracarboxylic acid, poly(acrylic acid), and the like.

To form the present oil- and water-repellent treatment preparations of the invention, a fluoropolymer and a tacking polymer—with or without optional additives such as i) hydroxyalkyl (meth)acrylate, ii) a compound such as poly(ethylene glycol) (meth)acrylate to improve solubility of the copolymer in water, and/or iii) a chain terminator—are diluted in water and mixed together with an anhydride-forming catalyst (as necessary) and, optionally, other components such as an antioxidant, a permanent softener/extender, and/or other additives. In a presently preferred embodiment, the permanent softener/extender is a copolymer or graft-copolymer of an anhydride-forming monomer and a soft, hydrophobic monomer (e.g., butadiene, ethylene, isopropylene, and the like).

Anhydride-forming catalysts that can be employed in the preparations of the present invention include, but are not limited to, alkali metal hypophosphites, alkali metal phosphites, alkali metal polyphosphates, and alkali metal dihydrogen phosphates. Some examples of such catalysts are NaH$_2$PO$_2$, H$_3$PO$_2$, Na$_3$PO$_4$, Na$_2$HPO$_4$, NaH$_{2PO4}$, and H$_3$PO$_4$.

The anhydride functional group will bind chemically with any substrate (including a particular fiber, yarn, fabric, or finished good) with available primary or secondary amines, hydroxyls, sulfhydryls, or metal oxides. For example, cellulosic-based webs such as paper, cotton, rayon, linen, and jute contain hydroxyls. Wool, which is a proteinaceous animal fiber, contains hydroxyls, amines, carboxylates, and thiols (disulfides).

The treatment preparation may comprise from about 1% to about 10% of the fluoropolymer, from about 1% to about 10% tacking polymer, and from 0% to about 7% anhydride-forming catalyst in water.

This invention is further directed to the fibers, yarns, fabrics, textiles, webs, or finished goods (encompassed herein under the term "fibrous substrates") treated with the water- and oil-repellent composition. Such fibrous substrates exhibit a greatly improved, "durable water and oil repellency"; that is, they remain water- and oil-repellent, even after multiple launderings, while retaining the other desirable properties of the untreated substrate.

The fibrous substrates of the present invention include fibers, woven and non-woven fabrics derived from natural or synthetic fibers and blends of such fibers, as well as cellulose-based papers, leather, and the like. They can comprise fibers in the form of continuous or discontinuous monofilaments, multifilaments, staple fibers, and yarns containing such filaments and/or fibers, and the like, which fibers can be of any desired composition. The fibers can be of natural, manmade, or synthetic origin. Mixtures of natural fibers and synthetic fibers can also be used. Included with the fibers can be non-fibrous elements,, such as particulate fillers, binders, sizes, and the like. The fibrous substrates of the invention are intended to include fabrics and textiles, and may be a sheet-like structure [woven (including jacquard woven for home furnishings fabrics) or non-woven, knitted (including weft inserted warp knits), tufted, or stitch-bonded] comprised of fibers or structural elements. Examples of natural fibers include cotton, wool, silk, jute, linen, and the like. Examples ;of manmade fibers derived primarily from natural sources include regenerated cellulose rayon, cellulose acetate, cellulose triacetate, and regenerated proteins. Examples of synthetic fibers include polyesters (including polyethyleneglycol terephthalate), polyamides (including nylon, such as Nylon 6 and 6,6), acrylics, olefins, aramids, azlons, modacrylics, novoloids, nytrils, spandex, vinyl polymers and copolymers, vinal, vinyon, and the like, and hybrids of such fibers and polymers.

The fluoropolymer/tacking polymer preparation of the present invention is applied as a solution or dispersion/emulsion to the fibrous substrate to be treated by methods known in the art such as by soaking, spraying, dipping, fluid-flow, padding, and the like. The fluoropolymer and the tacking polymer may either be applied simultaneously or the tacking polymer may be applied following application of the fluoropolymer. It is believed that reactive groups on the tacking polymer react with the fibrous material, by covalent bonding during cure, to attach to the fibrous substrate and to thus tack or otherwise hold the fluoropolymer durably to the substrate. The curing can take place either before or after the treated textile is removed from the solution and dried, although it is generally preferred that the cure occur after the drying step. The fibrous substrate may then be rinsed in water to remove any excess catalyst and polymer and dried to give the durable water- and soil-repellent textiles, webs and other fibrous substrates of the invention.

In applying the copolymer composition of the invention to the fibrous substrate to be treated, the pH range should be chosen to be compatible with the reactants. The process temperature can vary widely. However, the temperature should not be so high as to decompose the reactants or so low as to cause inhibition of the reaction or freezing of the solvent. Unless specified to the contrary, the processes described herein take place at atmospheric pressure over a temperature range from ambient temperature to an elevated temperature that is below the boiling point of the solvent used, preferably from about 10° C. to about 110° C. more preferably from about 20° C. to about 60° C. and most preferably at 20° C. Conveniently, the processes will be at ambient temperature. The process (cure) temperature can also vary widely, depending on the reactivity of the reactants. Unless specified to the contrary, the curing process described herein takes place at atmospheric pressure over a temperature range from about 110° C. to about 250° C. The time required for the processes herein will depend to a large extent on the temperature being used and the relative reactivities of the starting fibrous substrate and water-repellent polymeric preparation. Therefore, the time of exposure of the textile to the catalyst and the polymers in solution can vary greatly, for example from about a few seconds to about two hours. Normally, the exposure time will be from a few seconds to ten minutes. Unless otherwise specified, the process times and conditions are intended to be approximate.

EXAMPLES

The following example is intended to be illustrative and should not be construed as limiting the invention in any way.

Example 1

Unless otherwise indicated, the chemicals were purchased from Aldrich Chemical, Milwaukee, Wis.).

Zonyl TA-N fluorinated acrylate (64 g; E.I. DuPont, Dhuwater, N.J.), stearyl acrylate (C18; 18 g), poly(ethylene oxide) stearate (8 g; Chemax, Greenville, S.C.), poly(ethylene glycol)methacrylate (2 g), 2-hydroxyethyl methacrylate (1 g), dodecanethiol (0.5 g), and acetone (50 g) are mixed with 140 g of deionized water. The mixture is homogenized for about 15 minutes. While this is being done, the solution is also heated using a stir plate to about 45° C. to increase the rate of homogenization. The mixture is then transferred to a 500 mL reaction flask equipped with a stirrer. Stirring is started immediately after the solution is poured in. The flask is purged with $N_2$ gas for about 30 minutes.

Vinylidene chloride (18 g) is added afterward, followed by the free-radical initiator 2,2'-azobis(2-methylpropionamidine) dihydrochloride (1 g), which has been diluted with 10 g of water.

The oil bath temperature is increased to 60–80° C. (the minimum temperature recommended is 50° C.). The reaction is run for 8 hours or more (usually overnight).

To prepare a solution for fabric treatment, to water is added the above fluoropolymer (3 wt %), sodium hypophosphite (catalyst; 2 wt %), 1 wt % EDTA, 4 wt % polyacrylic acid (MW ~1800, 65% aqueous solution; Polysciences, Inc., Warrington, Pa.), and 4 wt % of the softener/extender poly(butadiene-graft-maleic anhydride) (Ricon 130MA 13, Ricon Resins, Grand Junction, CO). The solution is heated to 165° C. to form an anhydride from the acrylic acid and maleic acid groups.

The resulting composition is padded onto 12-oz. white cotton at room temperature to 100% wet pickup, and the cotton is dried at 85° C. for 20 min. The fabric is then cured by heating at 190° C. for 90 seconds. The anhydrides on the activated polymer have reacted with hydroxyl groups on the cotton fibers to give a treated textile with improved water and oil repellency.

What is claimed is:

1. A preparation for treating a textile, the preparation comprising i) a fluoropolymer comprising (a) a fluoroaliphatic radical-containing agent, (b) stearyl (meth) acrylate, and (c) a chlorine-containing compound selected from the group consisting of vinylidene chloride, vinyl chloride, 2-chloroethylacrylate, 2-chloroethyl vinyl ether, and 2-chloroethyl vinyl ether; and ii) a tacking monomer, oligomer or polymer containing at least one anhydride functional group or a group capable of forming an anhydride functional group.

2. A preparation according to claim 1, wherein said fluoropolymer further comprises hydroxyalkyl (meth) acrylate.

3. A preparation according to claim 1, wherein said fluoroaliphatic radical-containing agent is selected from those of the structure:

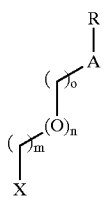

Formula I wherein:
- m is 0 to 2;
- n is 0 or 1;
- o is 1 or 2;
- A is —SO$_2$—, —N(W)—SO$_2$—, —CONH—, —CH$_2$—, or —CF$_2$—;
- R is a linear, branched, or cyclic fully- or partially-fluorinated hydrocarbon;
- W is hydrogen or C$_1$–C$_4$ lower alkyl; and
- X is acrylate (H$_2$C=CHCO$_2$—), methacrylate (H$_2$C=C(CH3)CO2—), or a carbon-carbon double bond (H$_2$C=CH—).

4. A preparation according to claim 1 wherein said tacking polymer is selected from the group consisting of poly(acrylic acid), poly(maleic acid), poly(maleic anhydride), and poly(butadiene/maleic acid).

5. A preparation according to claim 1 which further comprises an anhydride forming catalyst.

6. A preparation according to claim 5 wherein the catalyst is sodium hypophosphite.

7. A preparation according to claim 1 which further comprises an antioxidant.

8. A preparation according to claim 1 which further comprises a softener/extender.

9. A method for treating a fibrous substrate, the method comprising:
   exposing a fibrous substrate to an aqueous preparation comprising i) a fluoropolymer comprising (a) a fluoroaliphatic radical-containing agent, (b) stearyl (meth)acrylate, and (c) a chlorine-containing compound selected from the group consisting of vinylidene chloride, vinyl chloride, 2-chloroethylacrylate, 2-chloroethyl vinyl ether, and 2-chloroethyl vinyl ether; and ii) a tacking monomer, oligomer or polymer containing at least one anhydride functional group or a group capable of forming an anhydride functional group;
   removing said fibrous substrate from said preparation; and
   curing said fibrous substrate;
   to give a fibrous substrate having durable water and oil repellency.

10. A method according to claim 9 wherein said fluoropolymer further comprises hydroxyalkyl (meth)acrylate.

11. A method according to claim 9 wherein said fluoroaliphatic radical-containing agent is selected from those of the structure:

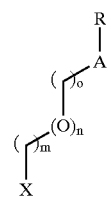

Formula I wherein:
- m is 0 to 2;
- n is 0 or 1;
- o is 1 or 2;
- A is —SO$_2$—, —N(W)—SO$_2$—, —CONH—, —CH$_2$—, or —CF$_2$—;
- R is a linear, branched, or cyclic fully- or partially-fluorinated hydrocarbon;
- W is hydrogen or C$_1$–C$_4$ lower alkyl; and
- X is acrylate (H$_2$C=CHCO$_2$—), methacrylate (H$_2$C=C(CH3)CO2—), or a carbon-carbon double bond (H$_2$C=CH—).

12. A method according to claim 9 wherein said tacking polymer is selected from the group consisting of poly(acrylic acid), poly(maleic acid), poly(maleic anhydride), and poly(butadiene/maleic acid).

13. A method according to claim 9 wherein said aqueous preparation further comprises an anhydride-forming catalyst.

14. A method according to claim 13 wherein the catalyst is sodium hypophosphite.

15. A method according to claim 9 wherein said aqueous preparation further comprises an antioxidant.

16. A method according to claim 9 wherein said aqueous preparation further comprises a softener/extender.

* * * * *